July 28, 1942. W. A. BRUNO 2,291,071
CONNECTING DEVICE
Filed Jan. 3, 1942
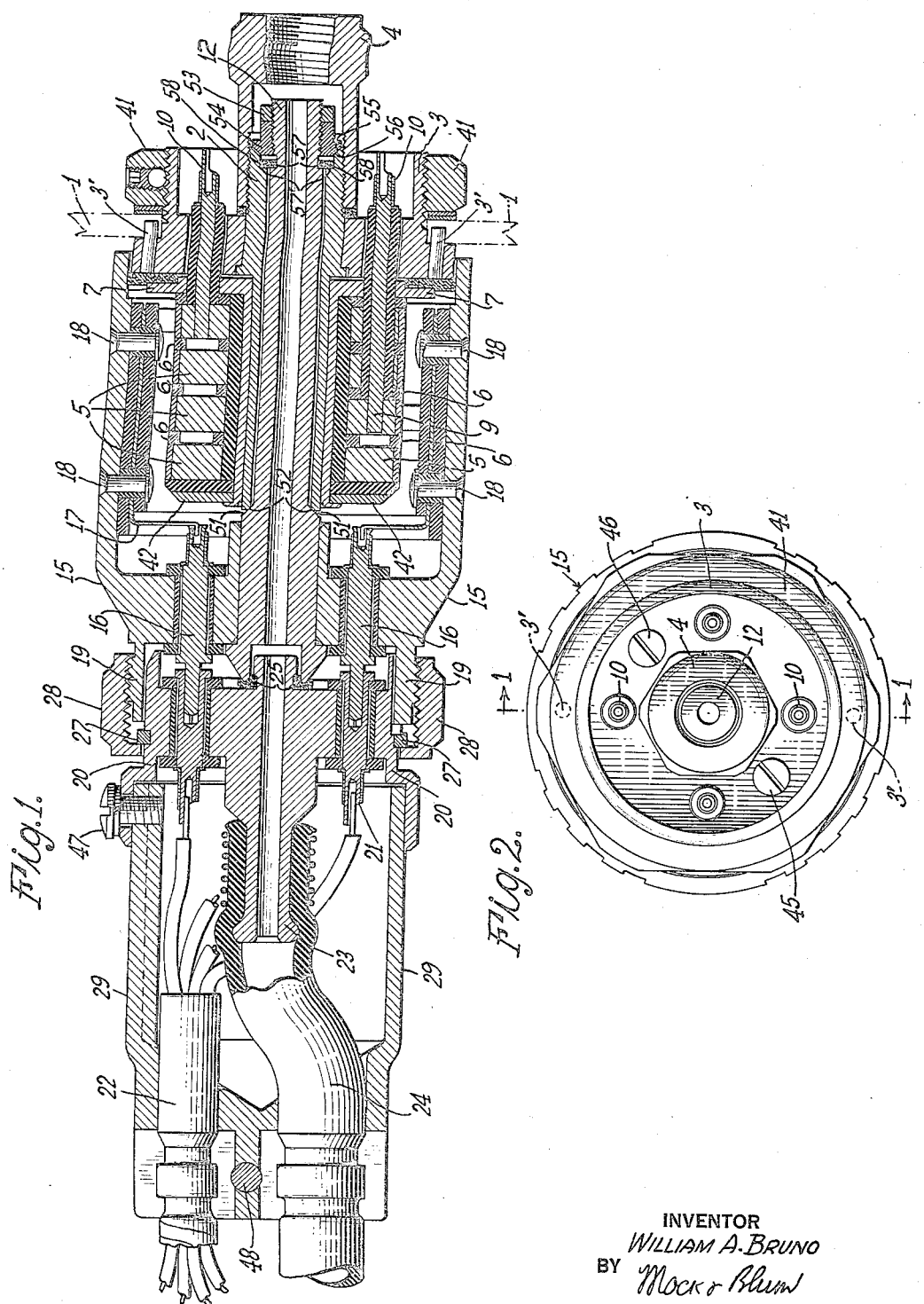
INVENTOR
WILLIAM A. BRUNO
BY Mock & Blum
ATTORNEYS be added to a batch of the cold rinse water before it is heated, if it is to be used promptly after heating, for the reason that the decomposition reaction takes place readily in hot solution but not in a cold solution, so that the decomposition does not start to an appreciable extent until the water is heated. As additional hot rinse water is supplied to the rinse tank to make up for losses, further quantities of gluconic acid and hydrogen dioxide should be added in the proper proportion to the amount of water added. Any type of constant feed equipment may be used, preferably synchronized with the circulating pump of the rinse solution.

In the practical treatment of any given water supply intended for rinsing purposes, the degree of hardness and the pH value of the water are important considerations. The amounts of gluconic acid and of hydrogen dioxide may be varied as determined by tests made on the particular water to be treated, to establish the minimum amounts of these materials which are required to produce a clear solution and a constant pH value of about 6.0 to 6.9 after evaporation of a substantial part of the water by heat.

Amounts satisfactory for water having 20 grains of bicarbonate hardness per gallon are as follows: gluconic acid, 0.375 gram, and hydrogen dioxide 3% U. S. P., 10 cubic centimeters per liter of water. The same proportions may be expressed as gluconic acid 0.0375%, and hydrogen dioxide 0.03%, for water having 20 grains of hardness per gallon. Approximately half as much gluconic acid and hydrogen dioxide would be used for water having 10 grains of hardness, and proportionate amounts for other hardnesses.

It is advisable not to use the hydrogen dioxide in amounts in excess of that required to oxidize the gluconic acid at the proper rate, otherwise oxygen may be liberated to oxidize or corrode the metal parts of the washing machine.

The importance of the combination of gluconic acid with hydrogen dioxide is illustrated by the fact that when a solution of the above mentioned quantity of gluconic acid in water of the above mentioned hardness, but without the hydrogen dioxide, is evaporated by heat to one-half of its original volume, the water at the end of such evaporation will be distinctly alkaline rather than acid, whereas the same water with the same quantity of gluconic acid plus the above mentioned quantity of hydrogen dioxide, when evaporated by heat to one-half of its original volume, will have approximately the same pH value at the end of such evaporation as at the beginning, and will still be mildly acidic in reaction.

Comparative tests made with sheet steel plates immersed in water having bicarbonate hardness, show that the noticeable corrosion of such plates caused by untreated water is greatly reduced or practically eliminated when the water has been treated according to this invention.

We claim:

1. Washing water containing in solution gluconic acid and hydrogen dioxide in sufficient amounts substantially to counteract bicarbonate hardness originally present in said water.

2. Washing water originally having bicarbonate hardness and containing in solution added gluconic acid in an amount sufficient to give the water a pH value in the range of about 6.0 to 6.9 and hydrogen dioxide in an amount sufficient to cause decomposition of the gluconic acid at a rate to supply carbon dioxide from such decomposition approximately as fast as carbon dioxide is lost from said water by boiling.

3. Washing water originally having bicarbonate hardness and containing in solution added gluconic acid and hydrogen dioxide in approximately the proportions of 0.037% by weight of gluconic acid and 0.03% by weight of hydrogen dioxide for water having 20 grains of hardness per gallon, and proportionately more or less gluconic acid and hydrogen dioxide for water having more or less original hardness.

4. The method of treating water originally having bicarbonate hardness to render it more suitable for use as a hot rinse, which comprises the steps of adding gluconic acid and hydrogen dioxide to said water in sufficient amounts substantially to counteract the bicarbonate hardness originally present in said water.

5. The method of treating water originally having bicarbonate hardness to render it more suitable for use as a hot rinse, which comprises the steps of adding to said water gluconic acid in an amount sufficient to give the water a pH value in the range of about 6.0 to 6.9 and hydrogen dioxide in an amount sufficient to cause decomposition of the gluconic acid at a rate to supply carbon dioxide from such decomposition approximately as fast as carbon dioxide is lost from the water by boiling.

6. The method of treating water originally having bicarbonate hardness to render it more suitable for use as a hot rinse, which comprises the steps of adding to said water gluconic acid and hydrogen dioxide in approximately the proportions of 0.0375% by weight of gluconic acid and 0.03% by weight of hydrogen dioxide for water having 20 grains of hardness per gallon, and proportionately more or less gluconic acid and hydrogen dioxide for water having more or less original hardness.

7. The method of washing food containers with water originally having bicarbonate hardness which includes the steps of washing said containers with an alkaline solution of said hard water and then rinsing said containers with a hot acid solution of said water containing gluconic acid and hydrogen dioxide in sufficient amounts substantially to counteract the bicarbonate hardness originally present in said water.

8. The method of washing food containers with water originally having bicarbonate hardness which includes the steps of washing said containers with an alkaline solution of said hard water and then rinsing said containers with a hot quantity of said water containing in solution gluconic acid in an amount sufficient to give the water a pH value in the range of about 6.0 to 6.9 and hydrogen dioxide in an amount sufficient to cause decomposition of the gluconic acid at a rate to supply carbon dioxide from such decomposition approximately as fast as carbon dioxide is lost from said water by boiling.

9. The method of washing food containers with water originally having bicarbonate hardness which includes the steps of washing said containers with an alkaline solution of said hard water and then rinsing said containers with a hot quantity of said water containing gluconic acid and hydrogen dioxide in approximately the proportions of 0.0375% by weight of gluconic acid and 0.03% by weight of hydrogen dioxide for water having 20 grains of hardness per gallon.

HENRY W. LEHMKUHL.
MYRON W. CUCCI.